United States Patent
Lim et al.

(10) Patent No.: US 6,370,582 B1
(45) Date of Patent: Apr. 9, 2002

(54) METHOD AND SYSTEM FOR PROVIDING CROSS-PLATFORM REMOTE CONTROL, MONITORING, AND UP-DATING OF A FACILITY ACCESS CONTROLLER

(75) Inventors: Hoon Chiat Lim; Kian Giap Lim; Yong Huat Sim, all of Singapore (SG)

(73) Assignee: ADC Technologies International Pte Ltd., Techpark I (SG)

(*) Notice: Subject to any disclaimer, the term of this patent is extended or adjusted under 35 U.S.C. 154(b) by 0 days.

(21) Appl. No.: 09/321,728

(22) Filed: May 28, 1999

(51) Int. Cl.[7] .............................................. G06F 15/16
(52) U.S. Cl. ........................ 709/230; 709/223; 709/250
(58) Field of Search ................................. 709/230, 223, 709/250

(56) References Cited

U.S. PATENT DOCUMENTS

| | | | | |
|---|---|---|---|---|
| 5,544,322 A | * | 8/1996 | Cheng et al. ................ | 709/229 |
| 5,546,584 A | * | 8/1996 | Lundin et al. ............... | 709/303 |
| 5,710,908 A | * | 1/1998 | Man ............................ | 709/230 |
| 5,854,893 A | * | 12/1998 | Ludwig et al. .............. | 709/204 |
| 5,894,557 A | * | 4/1999 | Bade et al. .................. | 709/228 |
| 5,901,286 A | * | 5/1999 | Danknick et al. ........... | 709/203 |
| 5,978,834 A | * | 11/1999 | Simonoff et al. ............ | 709/203 |
| 6,005,568 A | * | 12/1999 | Simonoff et al. ............ | 345/335 |
| 6,078,322 A | * | 6/2000 | Simonoff et al. ............ | 345/335 |
| 6,167,449 A | * | 12/2000 | Arnold et al. ............... | 709/227 |

* cited by examiner

Primary Examiner—Krisna Lim

(57) ABSTRACT

A system for providing cross-platform remote control and monitoring of a facility access controller, the system comprising a cross-platform network controller including, a CPU, a non-volatile memory, at least one of a network port and a cross-platform port, an input/output interface, at least one terminal control unit operatively linked to the input/output interface, the terminal control unit being capable of operating in a stand alone mode relative to the cross-platform network controller, at least one of an input access control device and an output access control device being operatively linked to the terminal control unit, a cross-platform network, and at least one remote computer operatively linked to the cross-platform network controller, the cross-platform network facilitating remote operation of the at least one terminal control unit while at least one of system upgrades and changes within the at least one terminal control unit are easily implemented via the cross-platform network controller.

29 Claims, 4 Drawing Sheets

METHOD AND SYSTEM FOR PROVIDING CROSS-PLATFORM REMOTE CONTROL, MONITORING, AND UP-DATING OF A FACILITY ACCESS CONTROLLER

BACKGROUND OF THE INVENTION

1. Field of the Invention

The present invention relates to a method and system for providing cross-platform remote control, monitoring, and updating of a facility access controller. The monitoring of the facility access controller includes detecting the status or monitoring of alarms operatively linked to a facility having controlled access thereto. The method and system employ a web based network controller that is operatively linked to an intranet and/or the world-wide web. The method and system enable data transfer between facility access controllers having different operating systems and between the web based network controller and remote sites that employ web browsers to access the web server of the web based network controller.

2. Description of the Background Art

Facility access controllers are used for controlling and monitoring physical access to buildings, rooms, and restricted areas. Such restricted areas typically employ some form of identification means to verify the identity of a user before the user can pass through the controlled or restricted area. The identification means typically includes a coded card or other type of data bearing record which employs specific coding to identify the user. Many facility access controllers are designed to have built-in electronic processing intelligence, having the ability to store unique identified codes in digital form, and to determine what users are allowed or not permitted to gain access to a controlled or restricted area.

Such facility access controllers include embedded controllers that monitor and control alarm and/or door status conditions. Such embedded controllers are referred to as terminal control unit (TCUs) that are designed to operate in a stand alone mode without relaying information to a central computer for data processing. The central computer is typically designed for management of a plurality of TCUs of a single facility. Most of the terminal control units communicate with the central computer via RS232, RS422, or RS485 type links and such links are predominantly based on proprietary communication protocol. A suite of security management systems software modules (SMS Software) are installed on each central computer of each facility. The SMS software is typically developed for a specific operating system (OS) platform and requires a certain amount of computing resources.

The SMS software suite is usually designed to monitor and control single or multiple terminal control units. Each SMS software suite is developed to operate on a single stand alone computer platform, or as a client-server software for multiple users in a local area network (LAN) or wide area network (WAN). Each SMS software module is developed to operate on a specific operating system. Thus, the developer/manufacturer of an SMS suite has to redevelop each and every SMS software module to run on different operating system platforms.

When an operating system is upgraded on a central computer, the corresponding SMS software modules have to be redeveloped and installed on the central computer and file server. Such upgrade requires extensive time and effort to keep each central computer running and operating efficiently. Furthermore, such a design increases the cost of the facility access control system for each central computer.

The conventional art is further limited in that the SMS software modules are typically developed for a single operating language, and different versions of each SMS software suite are required for a specific type of operating language.

Accordingly, a need in the art exists for a method and system for providing cross/platform remote control, monitoring, and upgrading of facility access controllers that have different operating systems. A further need exists in the art for a method and system for providing cross-platform remote control, monitoring, and upgrading of facility access controllers that permits a single change or multiple changes/upgrades in at least one of entry codes and operating parameters to be implemented into individual terminal control units of facility access controllers in a simultaneous manner.

SUMMARY OF THE INVENTION

Accordingly, it is a primary object of the present invention to provide a method and system for providing cross-platform remote control and monitoring of facility access controllers. It is a further primary object of the present invention to provide a method and system for implementing changes within terminal control units via remote computers which may or may not have similar operating systems relative to the terminal control units.

A further object of the present invention is to reduce the cost of software development, where facility access control software can be developed once and run on different operating systems.

Another object of the present invention is to provide a method and system for providing cross-platform remote control monitoring of facility access controllers or terminal control units of facilities that are operatively linked to a web based network controller so that a remote computer can communicate with the terminal control units using industrial protocol such as transmission control protocol over internet protocol (TCP-IP) and hypertext transfer protocol (HTTP).

An additional object of the present invention is to provide a method and system for providing cross-platform remote control monitoring of facility access controllers where the SMS software is developed as a web server application.

A further object of the present invention is to provide a method and system for providing cross-platform remote control and monitoring of facility access controllers where a remote computer only needs a standard web browser to access a web based network controller that is operatively linked to a plurality of terminal control units of facility access controllers.

A further object of the present invention is to provide a method and system for providing cross-platform remote control and monitoring of facility electronic access controllers where the web server of a web based network controller linking a plurality of terminal control units is designed using hypertexted mark-up language (HTML) standards that support different languages.

Another object of the present invention is to provide a method and system for providing cross-platform remote control and monitoring of facility access controllers where a web base network controller includes an E-mail server to permit the web base network controller to send data, log normal activity transactions, or security breach data, etc., to a remote user via an internet E-mail protocol. With such a method and system, specific or selected information can be transmitted by the web based network controller based on program control. Further, with such a method and system, specific or selected access information or data can be sent to multiple users at multiple locations via an internet Email system.

Another object of the present invention is to provide a method and system for providing cross-platform remote control and monitoring, and upgrading of facility access controllers having terminal control units where remote computers running on different operating systems can retrieve/access information or data generated by terminal control units via a web based network controller that employs E-mail software.

A further object of the present invention is to provide a method and system for providing cross-platform remote control and monitoring of facility access controllers having terminal control units where access data of the monitoring of restricted areas is provided to a remote computer via the web base network controller in real time. Such access data of restricted areas can include, but is not limited to, the card holder identification codes, results of biometric scans, device names, location descriptions, and system data base information in real time. Other access data includes displaying graphical images and dynamic status information on web pages and retrieving such information with a web browser of a remote computer via a web based network controller linking a plurality of terminal control units.

These and other objects of the present invention are fulfilled by providing a system for providing cross-platform remote control and monitoring of a facility access controller, the system comprising a cross-platform network controller including, a CPU, a non-volatile memory; at least one of a network port and a cross-platform port; an input/output interface; at least one terminal control unit operatively linked to the input/output interface, the terminal control unit being capable of operating in a stand alone mode relative to the cross-platform network controller; at least one of an input access control device and an output access control device being operatively linked to the terminal control unit; a cross-platform network; and at least one remote computer operatively linked to the cross-platform network controller, the cross-platform network facilitating remote operation of the at least one terminal control unit while at least one of system upgrades and changes within the at least one terminal control unit are easily implemented via the cross-platform network controller.

In addition, these and other objects of the present invention are also accomplished by a method for providing cross-platform remote control and monitoring of a facility access controller, the method comprising the steps of monitoring at least one terminal control unit with a cross-platform network controller; updating at least one of first identification data and operating parameters stored in the at least one terminal control unit with the cross-platform network controller; receiving second identification data with the at least one terminal control unit from an input access control device operatively linked to the at least one terminal control unit; comparing the first identification data stored in the at least one terminal control unit with said second identification data; and activating an output access control device operatively linked to the at least one terminal control unit if the first identification data matches the second identification data.

Additionally, these and other objects of the present invention are also accomplished by a computer program product for providing cross-platform remote control and monitoring of a facility access controller, the computer program product comprising a computer useable medium having computer readable code embodied therein, the computer readable code including an operating system computer readable program code device, the operating system computer program code device further includes, a web server code module; a TCP/IP code module; an E-mail server code module; and a CGI code module, the operating system computer readable program code device facilitating remote operation of the facility access controller while at least one of system upgrades and changes within the facility access controller are easily implemented via a cross-platform network controller.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
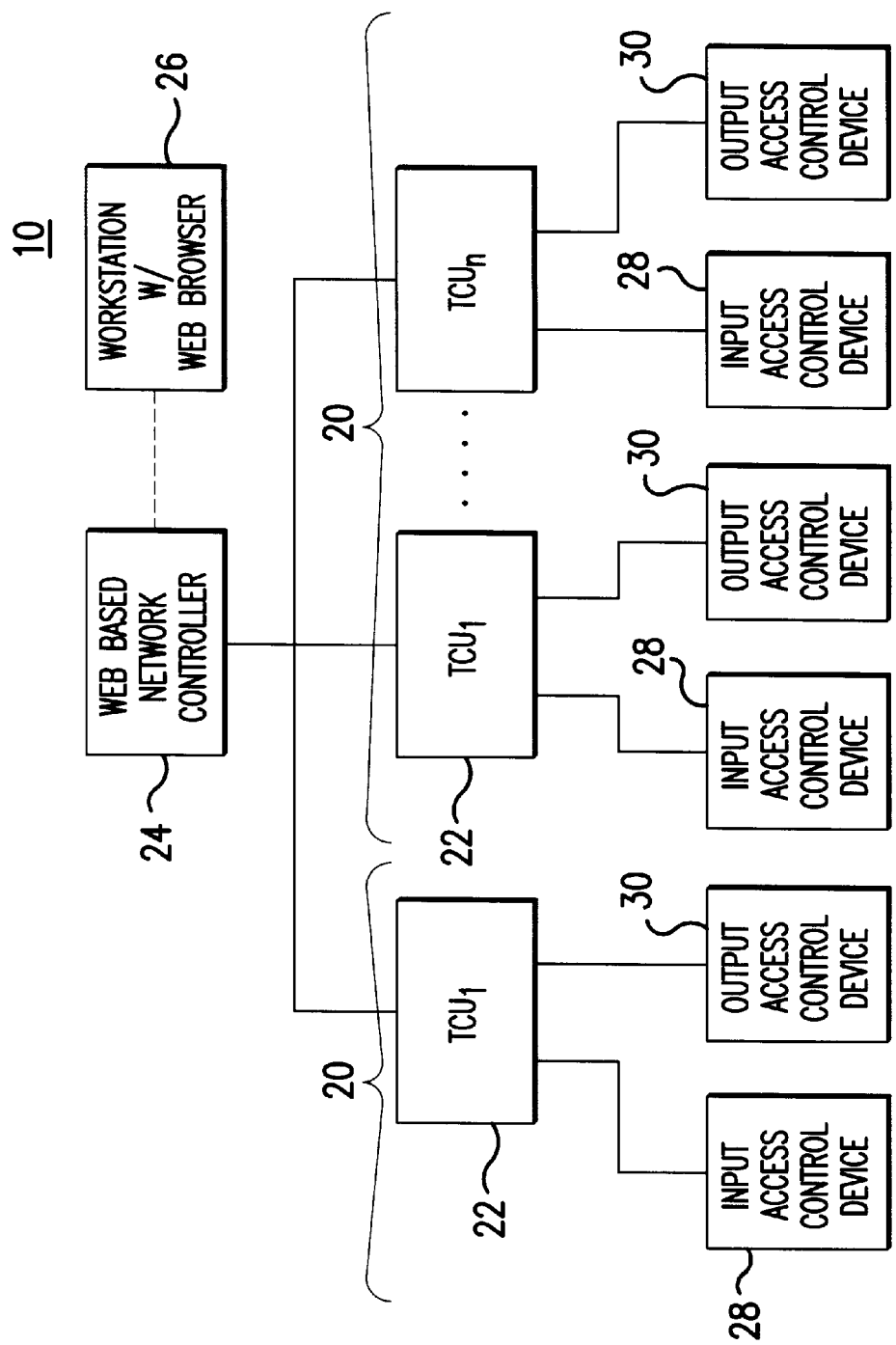
FIG. 1 illustrates a block diagram of a system for providing cross-platform remote control, monitoring, and updating of facility access controllers.

Referring in detail to the drawings and with particular reference to FIG. 1, a system 10 for providing cross-platform remote control, monitoring, and upgrading of facility access controllers 20 is illustrated. The facility access controllers 20 can include one or more terminal control units (TCUs) that are operatively linked to a web based network controller 24. The web based network controller is operatively linked to a remote workstation 26 via an on-line service (that permits access to the internet or intranet client-server distributed information retrieval system or what is commonly referred to as the world wide web-WWW).

Being operatively linked to the internet, the web based network controller 24 can be remotely monitored and controlled by a remote workstation 26 as discussed above. The remote computer 26 can monitor or control the web based network controller 24 from any geographical location as long as the remote computer 26 is operatively linked to an internet client server system and the web based network controller 24 is also linked to the internet.

The present invention is preferably designed so that remote computer 26 interacts with the web based network controller 24 by a web browser which employs both Java™ (object oriented programming language) and hypertext markup language (HTML) type languages. However, the present invention is not limited to these type of languages and can include other languages which permit cross-platform operation over the internet, intranet or world wide web. Other languages include, but are not limited to, Java™, Script, Java Beans, extensible mark up language (XML), standardized generalized markup language (SGMS), HTML programs which include Java Applets, virtual reality modeling language (VRML), and other like object oriented programming languages.

Figure 3:
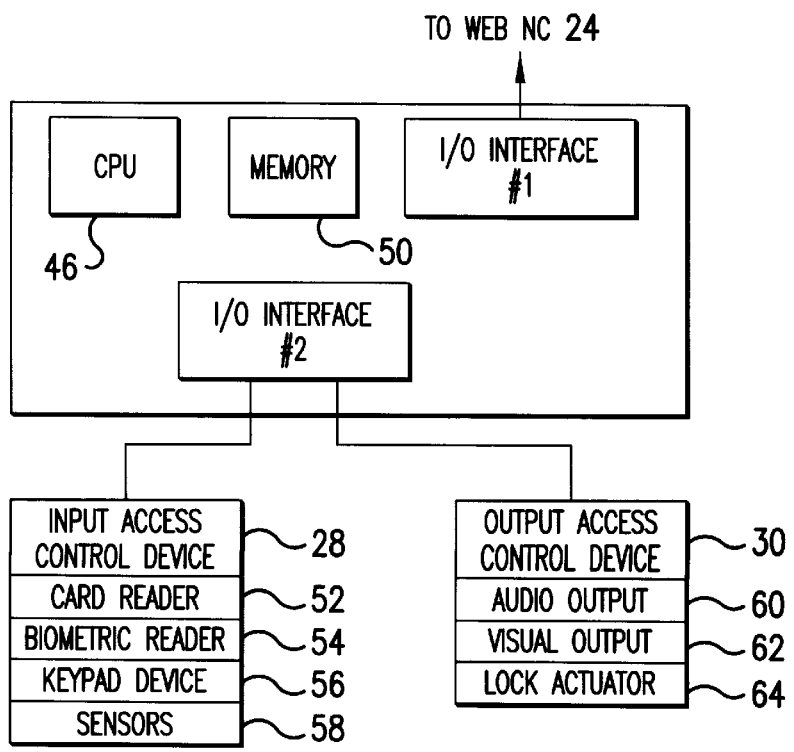
FIG. 3 illustrates a block diagram of a terminal control unit operatively linked to a web based network controller of the present invention.

Each terminal control unit 22 is operatively linked to input access control and/or monitoring devices 28 and output access control devices 30. One exemplary input access control and/or monitoring device 28 includes card key readers 52 (as illustrated in FIG. 3). Exemplary output access control devices 30 include lock actuators 64 (as illustrated in FIG. 3). Further details of each terminal control unit 22 will be discussed with reference to FIG. 3 hereinbelow.

With the hardware system architecture as illustrated in FIG. 1, the present invention facilitates remote control of a plurality of facility access controllers 20 that employ terminal control units 22 operatively linked to a single web based network controller 24. Remote control of the system is possible by a workstation 26 operatively linked to the world wide web (WWW) with a web browser. Such architecture simplifies programming and enhances the control over multiple facility access controllers 20.

Figure 2:
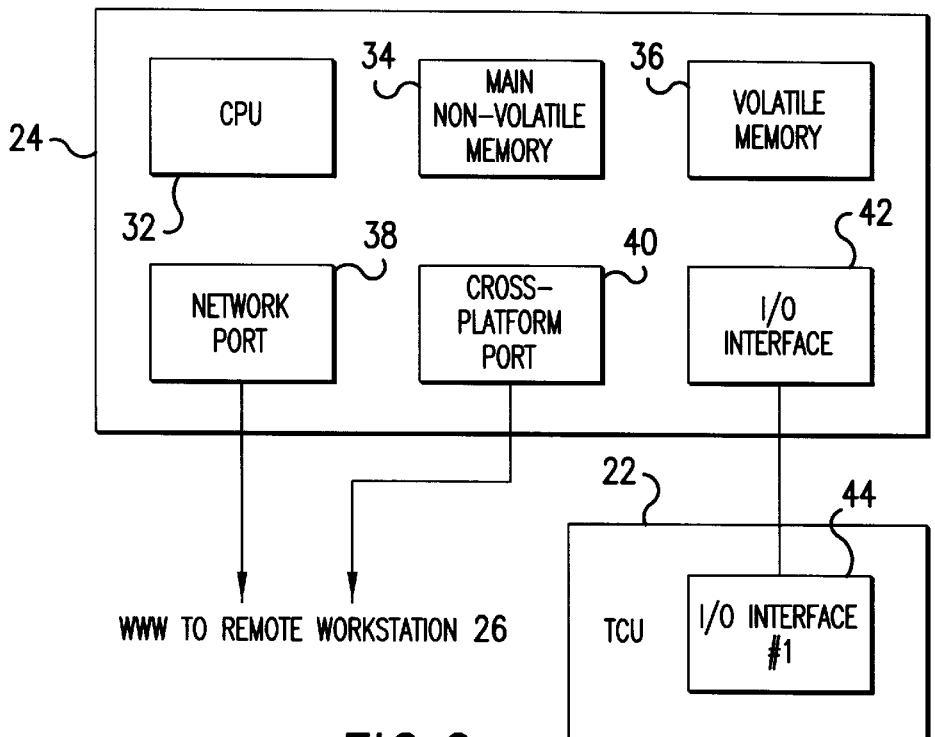
FIG. 2 illustrates a block diagram of the web base network controller of the present invention.

FIG. 2 illustrates the system hardware for the web based network controller 24. The web based network controller preferably includes a central processing unit 32 that is operatively linked to a main non-volatile memory 34 and a volatile memory 36. The CPU 32 is further operatively linked to a network port 38, a cross-platform port 40, and an input/output I/O interface 42.

The main non-volatile memory 34 is preferably at least one of an erasable programmable read-only memory (EPROM), an electrically erasable read-only memory (EEPROM), and a hard disk. The main non-volatile memory is designed to store the operating system (OS) application codes, CGI codes, and web pages for each of the facility access controllers 20.

The volatile memory 36 is preferably random access memory (RAM). Volatile memory 36 is the memory that the CPU 22 uses for most of the operations for the web base network controller 24.

Network port 38 is preferably an Ethernet™ (standardized access method for operations which include, but are not limited to, tracking data from the I/O interface 42 and providing the general system working local area network) network which employs at least one of an unshielded twisted pair (UTP) or coaxial cable to connect to a local area network (not shown).

The cross-platform port 40 is preferably a universal synchronized receiver/transmitter (UART) serial port. A UART is an integrated circuit used for serial communications, containing a transmitter (parallel-to-serial converter) and a receiver (serial-to-parallel converter), where the transmitter and receiver are clocked separately.

The cross-platform port 40 and network port 38 are not limited to the Ethernet network ports and UART serial ports. Other types of interfaces which can be supported by the present invention include, but are not limited to, fiberoptics, wireless LAN, parallel ports, a asynchronous transfer mode (ATM) and/or hardware applications that support transmission control protocol over internet protocol (TCP-IP). It is noted that TCP and IP specify two protocols at specific layers, where TCP/IP is often used to refer to the entire ISO protocol suite based upon these protocols, including Telnet, FTP, UDP, RDP, HTTP, SNT, and POP3.

The network port 38 and cross-platform port 40 are designed to be operatively linked to a service that permits access to the internet or intranet client-server distributed information retrieval system or world wide web (WWW). The input/output interface 42 is operatively linked to a first input/output interface 44 of a respective terminal control unit 22.

FIG. 3 illustrates exemplary system hardware for respective terminal control units 22. Each terminal control unit 22 has a central processing 46 operatively linked to a first I/O interface 44 and a second I/O interface 48. The central processing unit 46 is further operatively linked to a memory device 50. The memory device 50 may be any of the volatile or nonvolatile memory devices discussed above with respect to the web based network controller 24.

The terminal control unit 22 is typically of an embedded controller that is designed to operate in a stand lone mode without relaying information to the web based network controller 24 for data processing, or information relating to access control and/or alarm monitoring functions. The architecture of the terminal control unit 22 may be designed for single function use, such as for door access control, or automobile park area access control, elevator access control, guard patrol monitoring, alarm monitoring, and/or status monitoring, etc.

The architecture of each terminal control unit 22 may also be designed for a combination of more than one function as described above. Each terminal control unit 22 may also include firmware designed for specific functions. Firmware is defined typically as software stored in read-only memory (ROM) or programmable ROM (PROM). Programs in firmware are easier to change than hardware but are more difficult than software stored on a disk.

The firmware of each terminal control unit 22 typically handles the following functions: storing a list of unique digital information codes in the memory device 50 corresponding to identification token/numbers or biometric templates; comparing the stored digital code against presented identification token/codes; storing operating parameters to process and grant or deny access for parameters such as time zone parameters; holiday dates; access levels; personal identification numbers (PIN); and start and expiration date parameters.

Each terminal control unit 22 stores in buffers access control events (such as time of access or time of exit), alarm events, or other types of events in its memory device 50 when communication between any terminal control unit and the web based network controller fails due to a line open circuit, or due to an equipment failure. Each access control event is tagged with a time and date stamped according to a clock within the terminal control unit 22.

Each terminal control unit 22 receives new parameters from the web base network controller 24 relating to new list of identification tokens (each attached with similar or different operating parameters); a list of identification tokens to be deleted from memory within the terminal control unit 22; parameter changes to be made to selected identification tokens; and/or alarm monitoring commands set by the web base network controller 24 to reset alarm parameters.

The second input/output interface 48 is operatively linked to an input access control and/or monitoring device 28 and an output access control device 30. The input access and/or monitoring and output access control devices 28, 30 may reside externally to each terminal control unit 22 or they may be embedded into each terminal control unit 22 as a single unit.

An exemplary input access control device is a card key reader 52. The card key reader 52 can employ various hardware structures depending on the type of card key employed with the terminal control unit 22. Other types of card keys which permit access to facilities controlled by each terminal control unit 22 include, but are not limited to, magnetic stripe cards, bar-coded cards, integrated circuit (IC) circuit cards, smart cards, radio frequency (RF) cards, biometric cards, infrared type scanning cards and other like data bearing records. The present invention is not limited to card keys which employ only one of the above-mentioned card types and therefore can include any combinations thereof. For example, card keys can employ magnetic stripes as well as biometric identification indicators present on the card which are scanned by the card key reader 52.

The present invention is not limited to card key type input access control devices 52. Other types of input access control and/or monitoring devices 28 include but are not limited to, biometric readers 54 (such as retina-eye scans, skin prints, DNA scans, voice identification, facial, and combinations thereof), keypad devices 56 (which include a keypad to enter a predetermined code set), and other like reading devices which require identification of a user before permitting access to a facility or restricted area.

The access control device and/or monitoring device 28 can further include sensors 58 which detect the physical location of a user and/or the opening and closing of facility access entrance ways. Typical sensors include, but are not limited to, infrared sensors and other heat sensors, weight sensors, magnetic read switches, video cameras (such as digital cameras which can be operatively linked to the internet, intranet or world wide web), microphones, and other like sensing devices which detect the presence of living organisms. The input access control devices and/or monitoring devices 28 may also include computers combined with digital video cameras with microphones so that visual and audio recognition can be processed by the terminal control unit 22.

The output access control device 30 preferably includes, but is not limited to, audio output devices 60 and visual output devices 62. Other audio output devices 60 include but are not limited to speakers, sirens, and other types of alarms which are audible to living organisms. Visual output devices 62 include, but are not limited to, strobe lights, colored lights, video monitors, and other like video output devices which are perceptible by living organisms, such as humans.

The output access control device 30 further includes a lock actuator 64 that permits entry into restricted areas. Typical lock actuators include, but are not limited to, magnetic locks, electrically actuated deadbolts, hydraulically actuated locks, pneumatic actuated locks and other like lock actuators that permit opening of a door or opening of a aperture which leads to an enclosed space or restricted area.

The input control and/or monitoring devices 28 and output access control devices 30 can employ single devices or units and do not have to include a plurality of devices. In other words, input access control and/or monitoring devices 28 can be a card key reader 52 without employing sensors 58. Further, an output access control device 30 can include only one lock actuator without having audio output devices 60 or visual output devices 62. As noted above, a facility access controller can employ one or more terminal control units 22 for each facility.

Figure 4:
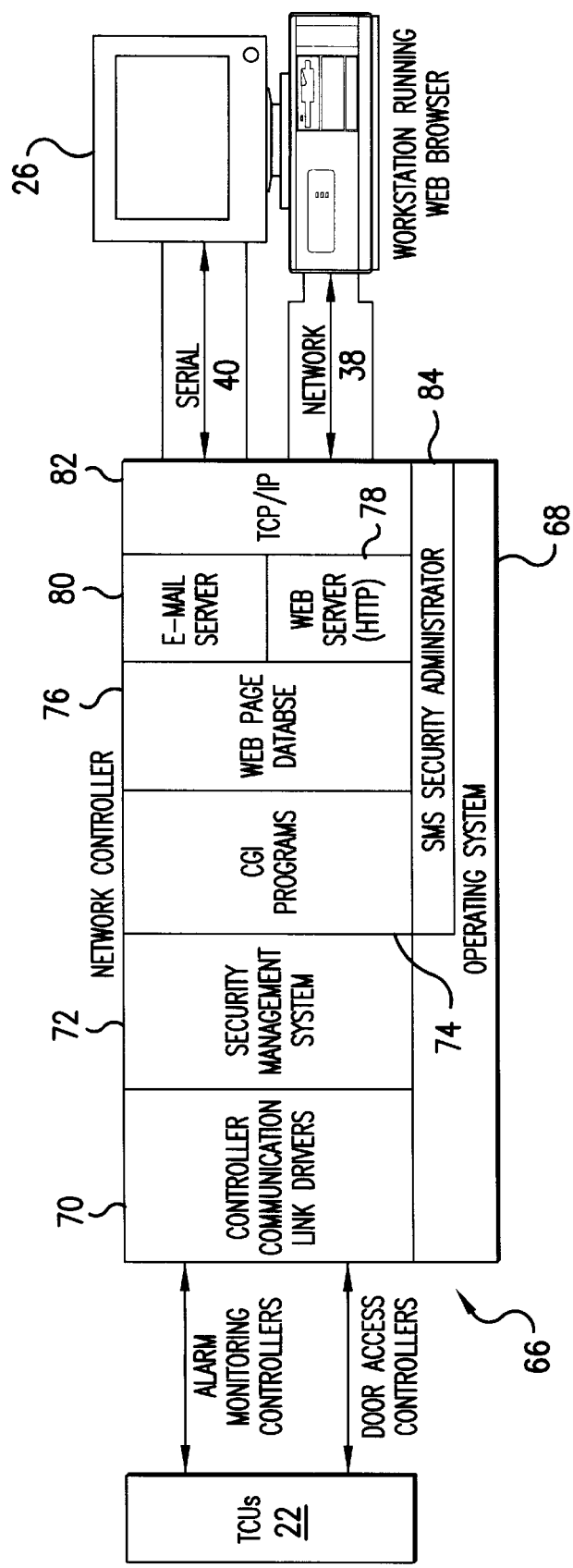
FIG. 4 illustrates a block diagram of the software modules which support a system for providing cross-platform remote control and monitoring of facility access controllers.

FIG. 4 illustrates the software structure 66 that is employed within the web based network controller 24. The web based network controller 24 preferably includes an operating system 68 that monitors several software modules that include the following: controller communication link drivers module 70; a security management system application suite module 72; common gateway interface (CGI) program modules 74; a web page data base module 76; a web server module 78; an E-mail server module 80, a transmission control protocol over internet protocol (TCP/IP) module; and a security management system security administrator module 84.

The software structure 66 of the web base network controller 24 interacts and exchanges data with the terminal control units 22. The operating system 68 is designed to permit data exchange with a remote computer 26 via the network port 38 or cross-platform port 40 (as shown in FIG. 2 above) of the web based network controller 24.

The operating system 68 of the web based network controller 24 monitors all of the modules to ensure that they are running concurrently. The operating system 68 manages all of the memory needs of the program modules in addition to all of the terminal control units 22. The operating system 68 manages all of the output access control data and input access control data received from the terminal control units 22 in addition to managing all of the micro-processor processing time slots.

The operating system 68 is preferably programmed in the C language. However, other programming languages are not beyond the present invention. Other programming languages include, but are not limited to, C++, Delphi, Java™ and Java script™, Pascal, Perl, Visual Basic, ADA and Eiffel.

With the TCP/IP module 82, different types of connections are available to connect multiple network web based network controllers to multiple terminal control units 22. Such connections include, but are not limited to, standard local area network (LAN) connection for intranet accesses; using standard land connection for internet accesses; and using standard modem through a serial RS 232 port with point-to-point protocol (PPP) for dial-in and/or dial-out internet access.

The web server program module 78 is designed to generate and serve web pages that include information that is stored in the memory of the web based network controller 24. The web server program module 78 employs hypertext transfer protocol (HTTP) which is the client-server TCP/IP protocol used on the world wide web (WWW) for exchange of HTML documents. The web server program module 78 is preferably based on the internet standard RFC 1945-hypertext transfer protocol-HTTP/1.0 and RFC 2068-hypertext transfer protocol-HTTP/1.1.

The web server program module 78 will typically perform at least one of the following functions in response to uniform resource locator (URL) information: retrieve a web page; execute a CGI program; or retrieve data from the client workstation. The web server program module 78 is not limited to these functions and can perform any necessary "server" functions which improve the web base network controller 24 performance. A CGI program that is executed with the web server program module 78 will pass a result through the web server program module 78 to reach a client workstation or remote computer 26.

The web page data base program module 76 provides services and functions such as the following: logging into the web based network controller 24; displaying past transactions of the web based network controller 24; pending, updating, and deleting card access in system data base information in the web based network controller 24 in real time; sending/updating data base information from the network controller 24 to terminal control units 22 in real time; display SMS application programs and controller system status in real time; display graphical maps or graphical floor plan layouts with alarm and door status information in real time; and centralized setup and control of access rights to different SMS functions for different users. The web pages of the present invention preferably support Java Applet and Java Script or Visual Basic script to enhance user interfaces.

The E-mail server program module 80 permits the security manage system security administrator 84 to send out E-mail to a user's/administrator's E-mail account, where the information can include the following: reports to an administrator regarding system status; hourly/daily alarm reports; hourly/daily transaction report; and daily time clocking transaction reports. The information generated by the E-mail server program module 80 can be programmed to be formatted as standard text E-mail or as a text file attachment in an E-mail message.

The common gateway interface (CGI) program module 74 provides a standard interface on how data is passed between the web server program module 78 and the SMS data bases in application software modules. The CGI program module 74 can include a set of programs that will be executed depending on the web server request received from a remote workstation 26. The CGI program module is employed to perform the following functions: treat data from web pages and store this information in a card/system data base (e.g. adding new a card users information, or deleting a user from the card data base); creating a web page dynamically from request of a web page (e.g. display all past transactions for a specific card holder, or display all the alarm transactions occurring from a specific alarm sensor); providing dynamic updating of graphical maps or floor plans status information; checking and verifying web log-in and access rights; and sending information to selective controllers from the web based network controller 24.

The SMS security administrator program module 72 provides user log-in access security management. This program module 72 allows the system administrator to define who can access and/or control what information is provided by the SMS. The SMS security administrator program module controls the web pages information for each user, when a user logs in using his or her account.

The SMS security administrator program module 84 checks the log-in account with the information that is stored in its database. When a match is found, it will tag the user with an access token that defines a user's access rights. Such a design provides a single point access control definition for different users across the network who are not located in one building. The SMS security administrator program module 84 may require the user name and password for log-in, plus an additional hardware security token such as a smart card with a smart card reader attached to a user's computer.

The communication link drivers program module 70 and the security management system program module 72 are designed to operate as two separate programs. These two program modules communicate with each other via network TCP/IP sockets, where these two programs will support end to end connections. Such a design permits the security management system program module 72 to connect and communicate with multiple controller communication links drivers on different systems on a network. Such a design also allows the same communication link drivers to connect and communicate with multiple security management systems on different systems.

The communication link drivers and security management system program modules 70 and 72 allow an access control system to be scalable from a single site or building to support multiple sites or buildings. Each site or building will have at least one web based network controller 24 depending on the configuration of the links between the communication links drivers and the security management system. The web based network controller 24 can monitor and control buildings at its own site and/or other buildings depending on the connection links.

Figure 5:
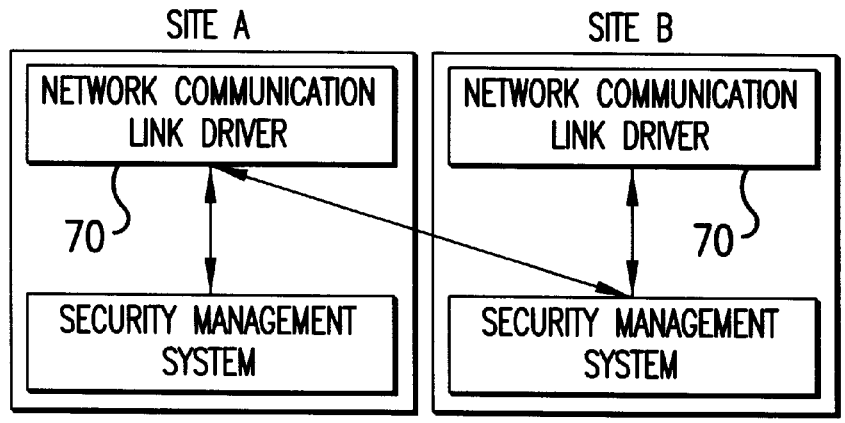
FIG. 5 illustrates a system of multiple facility electronic access controllers.

FIG. 5 illustrates a security management system at site A connected to its own network communication link driver 70. In such a design, the security management system of site A can only monitor and control one or more terminal control units 22 at site A. For site B, the security management system is connected to both communication link drivers of site A and site B and therefore the security management system of site B can monitor and control one or more terminal control units 22 at site A and site B.

Figure 6:
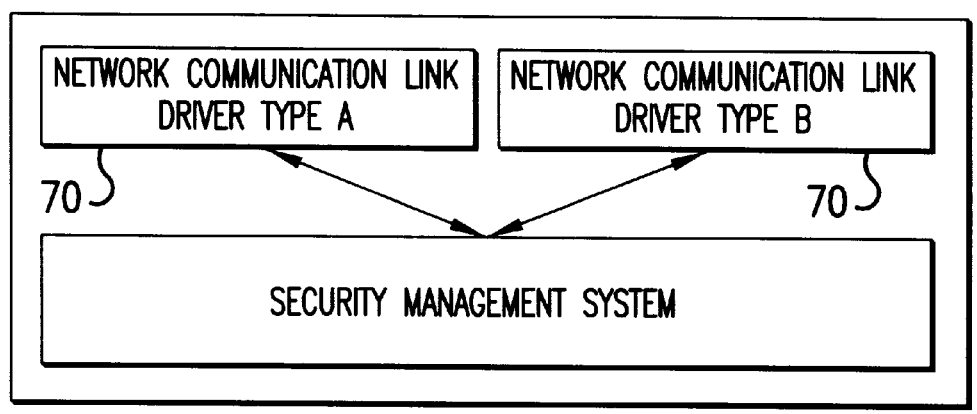
FIG. 6 illustrates a security management system that supports multiple network communication link drivers of the present invention.

Such a design allows the system to support different types of network communication link drivers 70 at the same site as illustrated in FIG. 6. The different network communication link drivers provide support for different types of terminal control units 22 and/or for different types of electrical interfaces such as RS232, RS422, RS 485, and/or modem dial-out or dial-in.

DESCRIPTION OF OPERATION OF THE PRESENT INVENTION

The present invention provides a method and system for providing cross-platform remote control of facility access controllers 20 having terminal control units 22. The present invention provides a method and system where a remote computer 26 having a first operating system may update the facility access information in terminal control units 22 which may have a second operating system that is different from the first operating system of the remote computer 26. With such a design, access control information can be easily and readily implemented across multiple terminal control units 22 during a single transaction.

With the present invention, computer support, maintenance, and administration of programming multiple terminal control units 22 is greatly reduced and simplified. The present invention provides a modular design that is easily implemented across a network. The web based network controller 24 operating from a central point, provides system functions to monitor, control and manage all terminal control units 22 information across multiple sites/buildings. The present invention is capable of sending and retrieving information to CGI program modules. The invention manages a set of data bases that store all information for all terminal control unit 22 operations and transactions.

The invention being thus described, it will be obvious that the same may be varied in many ways. Such variations are not to be regarded as a departure from the spirit and scope of the invention, and all such modifications as would be obvious to one skilled in the art were intended to be included within the scope of the following claims.

What is claimed is:

1. A system for providing cross-platform remote control and monitoring of a facility access controller, the system comprising:

a cross-platform network controller including,
  a CPU;

a non-volatile memory;

at least one of a network port and a cross-platform port;

an input/output interface;

at least one terminal control unit operatively linked to said input/output interface, said terminal control unit being capable of operating in a stand alone mode relative to said cross-platform network controller;

at least one of an input access control device and an output access control device being operatively linked to said terminal control unit;

a cross-platform network; and at least one remote computer operatively linked to said cross-platform network controller, said cross-platform network facilitating remote operation of said at least one terminal control unit while at least one of system upgrades and changes within said at least one terminal control unit are easily implemented via said cross-platform network controller.

2. The system of claim 1, wherein said at least one terminal control unit has a central processing unit.

3. The system of claim 1, wherein said at least one terminal control unit is an embedded controller having firmware designed for at least one of controlling access and monitoring of alarms of a controlled access area.

4. The system of claim 1, wherein said cross-platform network controller includes a web server system.

5. The system of claim 1, wherein said network controller includes an E-mail server system.

6. The system of claim 1, wherein said cross-platform network includes a local area network.

7. The system of claim 1, wherein said cross-platform network controller generates page data of information available on said cross-platform network identified by a uniform resource locator.

8. The system of claim 1, wherein said cross-platform network controller formats at least one of identification data, time data, and location data into an electronic mail message.

9. The system of claim 1, wherein said CPU runs a first operating system software and said remote computer runs a second operating system software, said first operating system software is different than said second operating system software.

10. The system of claim 1, wherein said CPU runs a controller operating system software, said controller operating system software includes a TCP/IP program module, a system administration program module, and an internet server program module.

11. The system of claim 1, wherein said input access control device includes at least one of a card key reader, a biometrics reader, and a keypad device.

12. The system of claim 1, wherein said input access control device includes a sensor.

13. The system of claim 1, wherein said output access control device includes at least one of an audio output device, a visual output device, and an actuator of a lock.

14. A method for providing cross-platform remote control and monitoring of a facility access controller, the method comprising the steps of:

monitoring at least one terminal control unit with a cross-platform network controller;

updating at least one of first identification data and operating parameters stored in said least one terminal control unit with said cross-platform network controller;

receiving second identification data with the at least one terminal control unit from an input access control device operatively linked to the at least one terminal control unit;

comparing the first identification data stored in said at least one terminal control unit with said second identification data; and activating an output access control device operatively linked to said at least one terminal control unit if said first identification data matches said second identification data.

15. The method of claim 14, further comprising the steps of:

generating at least one of time data and location data with the at least one terminal control unit in response to said first identification data; and transferring said second identification data and at least one of said time data and said location data with the at least one terminal control unit to said cross-platform network controller.

16. The method of claim 14, further comprising the step of storing said second identification data and at least one of said time data and said location data in a non-volatile memory of said at least one terminal control unit.

17. The method of claim 14, further comprising the steps of:

accessing at least one of said first identification data, said second identification data, said time data, and said location data from said at least one terminal control unit with a remote computer operatively linked via a cross-platform network to said cross-platform network controller; and changing at least one of said first identification data, said second identification data, said time data, said location data, and operating parameters of said at least one terminal control unit with said remote computer.

18. The method of claim 14, where in the steps of accessing and changing data of the facility electronic access controller includes operatively linking a remote computer to a web server system disposed in said cross-platform network controller.

19. The method of claim 14, further comprising the steps of:

displaying at least one of graphical data and text data corresponding to at least one of said first identification data, said second identification data, said time data, said location data, and operating parameters of the facility electronic access controller on a video device of a remote computer operatively linked to the controller via said cross-platform network controller; and changing at least one of said first identification data, said second identification data, said time data, said location data, and operating parameters of the facility electronic access controller with the remote computer.

20. The method of claim 14, further comprising the step of:

formatting at least one of said first identification data, said second identification data, said time data, and said location data into an electronic mail message with said cross-platform network controller.

21. The method of claim 14, further comprising the step of:

generating a page of information available on web server system within said cross-platform network controller identified by a uniform resource locator.

22. The method of claim 14, further comprising the steps of:

operating the at least one terminal control unit with a first operating system; and operating the remote computer with a second operating system, said second operating system being different than said first operating system.

23. The method of claim 14, wherein the step of receiving said second identification data further includes the step of reading a card key which is placed adjacent to a reader.

24. The method of claim 14, wherein the step of activating an output control device includes the step of activating an actuator of a lock, and unlocking said lock to permit entry into a controlled area.

25. A computer program product for providing cross-platform remote control and monitoring of a facility access controller, the computer program product comprising:

a computer useable medium having computer readable code embodied therein, said computer readable code including an operating system computer readable program code device, said operating system computer program code device further includes,
a web server code module;
a TCP/IP code module;
an E-mail server code module; and
a CGI code module, said operating system computer readable program code device facilitating remote operation of the facility access controller while at least one of system upgrades and changes within the facility access controller are easily implemented via a cross-platform network controller.

26. The computer program product of claim 25, wherein said operating system computer readable program code device includes a security administrator code module, said security administrator code module provides user login access to said controller operating system computer readable program code device.

27. The computer program product of claim 25, wherein said web server code module generates web pages, said web pages including at least one of alarm status and user entry/exit information of a facility.

28. The computer program product of claim 25, wherein said operating system computer readable program code device further includes a plurality of communication link drivers, said drivers capable of operatively linking said operating system to a plurality of facility access controllers.

29. The computer program product of claim 28, wherein said operating system computer readable program code device includes a security administrator code module, said security administrator code module provides user login access to said controller operating system computer readable program code device, said security administrator code module communicates with said communication link drivers via a plurality of TCP/IP sockets, said security administrator code module in accordance with said communication link drivers being able to communicate with a plurality of facility access controllers.

\* \* \* \* \*